under 35
U.S.C. 154(b) by 109 days.

(12) United States Patent
Iwata (10) Patent No.: US 9,027,428 B2
(45) Date of Patent: May 12, 2015

(54) NON-CONTACT SENSOR AND SHIFT LEVER DEVICE (71) Applicant: Kabushiki Kaisha Tokai Rika Denki Seisakusho, Aichi (JP)

(72) Inventor: Masayoshi Iwata, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 109 days.

(21) Appl. No.: 13/920,400

(22) Filed: Jun. 18, 2013

(65) Prior Publication Data
US 2013/0340557 A1    Dec. 26, 2013

(30) Foreign Application Priority Data

Jun. 20, 2012   (JP) ................... 2012-139231

(51) Int. Cl.
| B60K 20/00 | (2006.01) |
| B60K 17/04 | (2006.01) |
| B60K 17/12 | (2006.01) |
| G05G 9/00 | (2006.01) |
| G01B 7/14 | (2006.01) |
| G01B 7/30 | (2006.01) |
| G01R 33/00 | (2006.01) |
| F16H 59/10 | (2006.01) |
| G01B 7/00 | (2006.01) |

(52) U.S. Cl.
CPC .............. G01B 7/14 (2013.01); F16H 59/105 (2013.01); Y10T 74/2003 (2015.01); G01B 7/003 (2013.01)

(58) Field of Classification Search
USPC ............ 74/473.1, 473.12, 473.3; 324/207.11, 324/207.13, 207.15, 207.16, 207.17, 207.2, 324/207.21, 207.22, 207.24, 260, 262; 336/136, 206
See application file for complete search history.

(56) References Cited

U.S. PATENT DOCUMENTS

| 4,124,814 | A | * | 11/1978 | Lauerman ................... 324/207.2 |
| 4,253,079 | A | * | 2/1981 | Brosh ......................... 336/84 C |
| 4,893,078 | A | * | 1/1990 | Auchterlonie ............ 324/207.17 |
| 5,291,152 | A | * | 3/1994 | Seale .............................. 331/65 |
| 5,307,013 | A | * | 4/1994 | Santos et al. ................ 324/207.2 |
| 5,804,963 | A | * | 9/1998 | Meyer ....................... 324/207.17 |
| 5,815,091 | A | * | 9/1998 | Dames et al. ............. 340/870.34 |
| 5,939,879 | A | * | 8/1999 | Wingate et al. ........... 324/207.17 |
| 6,316,936 | B1 | * | 11/2001 | Striker et al. ............. 324/207.21 |
| 6,339,325 | B1 | * | 1/2002 | Oda et al. .................. 324/207.2 |
| 6,384,597 | B1 | * | 5/2002 | Irle et al. .................. 324/207.17 |
| 6,573,707 | B2 | * | 6/2003 | Kiriyama et al. ......... 324/207.17 |
| 6,853,183 | B2 | * | 2/2005 | Kindler ..................... 324/207.17 |
| 7,015,687 | B2 | * | 3/2006 | Meyer ....................... 324/207.17 |
| 7,049,924 | B2 | * | 5/2006 | Hayashi et al. ............... 336/200 |
| 7,161,348 | B2 |   | 1/2007 | Luber et al. |
| 7,701,201 | B2 |   | 4/2010 | Zapf et al. |

(Continued)

FOREIGN PATENT DOCUMENTS

| JP | 4146490 | 6/2008 |
| JP | 2008-256693 | 10/2008 |
| WO | 2005/027347 | 3/2005 |

*Primary Examiner* — William Kelleher
*Assistant Examiner* — Jake Cook
(74) *Attorney, Agent, or Firm* — Greenblum & Bernstein, P.L.C.

(57) ABSTRACT

A non-contact sensor includes a substrate having a groove, two pattern coils arranged on opposite sides of the groove, a detected object connected to the shift lever and moved in cooperation with the shift lever along the groove, and a signal processing circuit that calculates a movement amount of the shift lever based on an output value provided from the pattern coils.

8 Claims, 6 Drawing Sheets

(56) References Cited

U.S. PATENT DOCUMENTS

| | | |
|---|---|---|
| 8,198,971 B2 * | 6/2012 | Takenaka et al. .............. 336/200 |
| 2006/0093169 A1 * | 5/2006 | Takahashi et al. ............ 381/182 |
| 2008/0197963 A1 * | 8/2008 | Muto ............................ 336/200 |
| 2009/0091313 A1 * | 4/2009 | Teeters et al. ............ 324/207.16 |
| 2011/0025308 A1 * | 2/2011 | Kitanaka et al. ......... 324/207.11 |

* cited by examiner

NON-CONTACT SENSOR AND SHIFT LEVER DEVICE

CROSS-REFERENCE TO RELATED APPLICATIONS

This application is based upon and claims the benefit of priority from prior Japanese Patent Application No. 2012-139231, filed on Jun. 20, 2012, the entire contents of which are incorporated herein by reference.

BACKGROUND ART

The present invention relates to a non-contact sensor and a shift lever device.

Japanese Patent No. 4146490 and Japanese Laid-Open Patent Publication No. 2008-256693 describe a non-contact sensor including a conductive operation member (actuator) and sensor coils to detect the position of a detection subject without contacting the detection subject. The inductance of the sensor coils changes in accordance with whether or not the sensor coils are covered by the operation member or the amount of the sensor coils covered by the operation member. The non-contact sensor detects the position of the operation member, that is, the detection subject, in accordance with the inductance of the sensor coil.

The sensor coil output of the non-contact sensor is in accordance with the distance of the operation member from the sensor coils. The inventor of the present invention has found that detection errors occur when the distance between the sensor member and the sensor coils changes.

SUMMARY

One aspect of the present invention is a non-contact sensor that detects a movement amount of a detection subject. The non-contact sensor is provided with a substrate including a groove, a plurality of pattern coils including two opposing pattern coils arranged on opposite sides of the groove, and a detected object connected to the detection subject and moved in cooperation with the detection subject along the groove. Movement of the detected object changes a degree of magnetic coupling between the two pattern coils. A signal processing circuit calculates a movement amount of the detected object based on an output value provided from the pattern coils.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENT

A non-contact sensor and a shift lever device according to one embodiment of the present invention will now be described.

Figure 1:
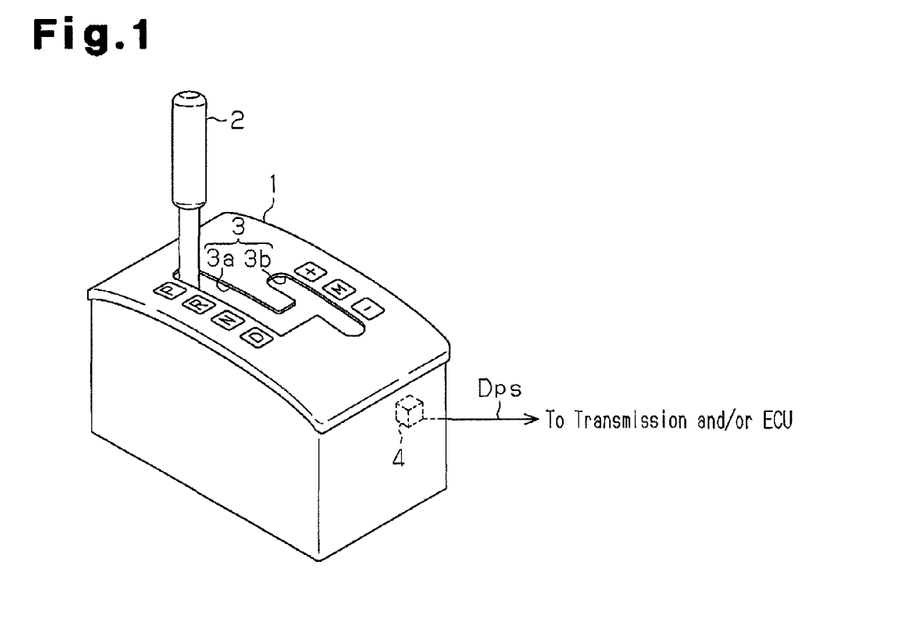
FIG. 1 is a perspective view showing one embodiment of a shift lever device.

FIG. 1 shows a shift lever device 1 installed in a vehicle that uses an automatic transmission. The shift lever device 1 includes a shift lever 2 that shifts the drive state of the transmission. In the illustrated example, the shift lever device 1 is of a shift-by-wire type that provides the transmission with an electric signal indicating the operational position of the shift lever 2. Further, the shift lever 2 is of a stationary type that holds the operational position of the shift lever 2. The shift lever 2 corresponds to a detection subject.

The shift lever 2 is movable along a gate 3. The gate 3 may be H-shaped and include a left gate 3a and a right gate 3b. A parking (P) position, a reverse (R) position, a neutral (N) position, and a drive (D) position are arranged in the left gate 3a. A plus (+) position and a minus (−) position, which sequentially shift gears, are arranged in the right gate 3b.

The shift lever device 1 includes a position detector 4 that detects the position of the shift lever 2. The position detector 4 detects whether the shift lever 2 is located at the P position, the R position, the N position, the D position, the M position, the + position, or the − position and outputs a position detection signal Dps indicating the detected position. The position detection signal Dps is provided to, for example, the transmission or another ECU.

Figures 3A, 3B:
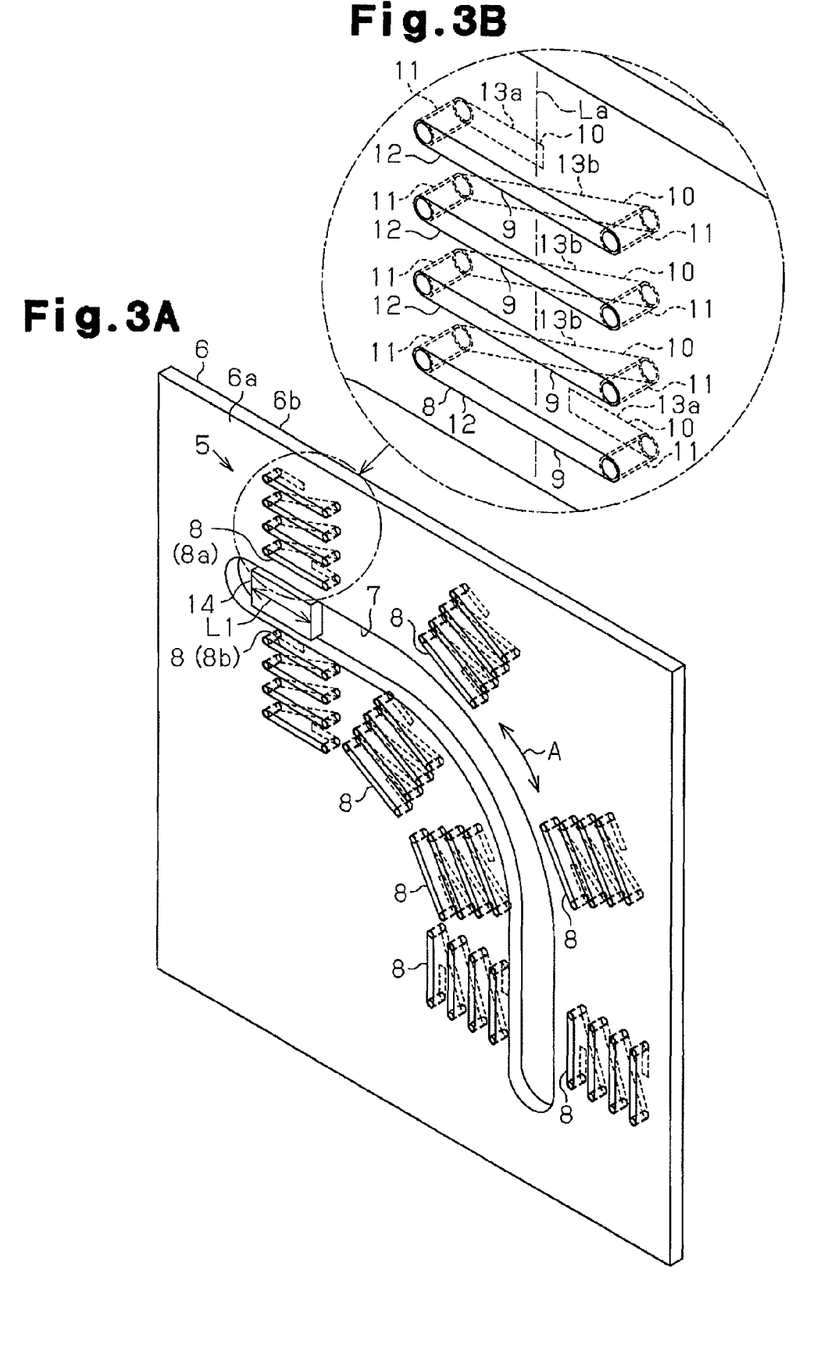
FIG. 3A is a perspective view of a non-contact sensor.
FIG. 3B is a partial enlarged view of FIG. 3A.

FIG. 3A shows a non-contact sensor 5, which is included in the position detector 4. The non-contact sensor 5 is configured to detect a sequential operation of the shift lever 2. The non-contact sensor includes a board 6. A groove 7 is formed in the board 6. Preferably, the board 6 has a thickness of 1 mm or greater. In the illustrated example, the shift lever 2 is movable along an arcuate path, and the groove 7 may be an arcuate groove conforming to the path of the shift lever 2. When the shift lever 2 moves straight, the groove 7 may be a straight groove. The board 6 corresponds to a substrate.

The non-contact sensor 5 is a magnetic coupling type sensor. A plurality of coil elements 8 (pattern coils) are arranged along the groove 7. The coil elements 8 are arranged in pairs so that one coil element 8 is arranged at one side of the groove 7 and the other coil element 8 is arranged at the other side of the groove 7. Each coil pair includes a transmission coil element 8a and a reception coil element 8b, which are arranged on opposite sides of the groove 7. The transmission coil element 8a may be magnetically coupled to the reception coil element 8b. In the example of FIG. 3A, a plurality of (four) coil pairs are arranged along the groove 7 in controlled intervals, for example, equal intervals.

Referring to FIG. 3B, each coil element 8 includes a plurality of front conductive strips 9, which are formed on a front surface 6a of the board 6, a plurality of rear conductive strips 10, which are formed on a rear surface 6b of the board 6, and a plurality of vias 11, which couple the front conductive strips 9 and the rear conductive strips 10. Each conductive strip is formed from, for example, a metal. In the illustrated example, each conductive strip is straight.

A front conductive strip 9, a via 11, and a rear conductive strip 10 that are coupled to one another define a folded portion 12. The rear conductive strips 10 of each coil element 8 include two terminals, namely, rear terminal conductive strips 13a, and a plurality of parallel rear intermediate conductive strips 13b, which are arranged between the rear terminal conductive strips 13a. In a non-restrictive example, the two rear terminal conductive strips 13a are parallel to the front conductive strips 9, and the rear intermediate conductive strips 13b are not parallel to the front conductive strips 9. Each coil element 8 has a coil axis La that intersects the groove 7. In one example, each terminal, that is, each rear terminal conductive strip 13a, of the coil elements 8a and 8b is exposed on the same surface (e.g., rear surface 6b) of the board 6.

A movable detected object 14 is arranged in the groove 7 and supported to be movable along the groove 7. The detected object 14 is, for example, a metal block. The detected object 14 has a length L1 that is set to allow the detected object 14 to simultaneously oppose at least a portion of each of two coil pairs that are adjacent along the groove 7. A degree of magnetic coupling between opposing coil elements 8a and 8b changes in accordance with the movement or position of the detected object 14. For example, the degree of magnetic coupling between the coil elements 8a and 8b of a coil pair changes when the detected object 14 moves into the area between the coil elements 8a and 8b of the coil pair.

The shift lever 2 includes a projection (not shown) that engages the detected object 14 when the shift lever 2 moves from the gate 3a to the gate 3b. The detected object 14 moves along the groove 7 in cooperation with the shift lever 2. In this manner, the detected object 14 is moved to positions corresponding to the sequential operation of the shift lever 2. When the shift lever 2 moves from the gate 3b to the gate 3a, the projection of the shift lever 2 is disengaged from the detected object 14.

Figure 2:
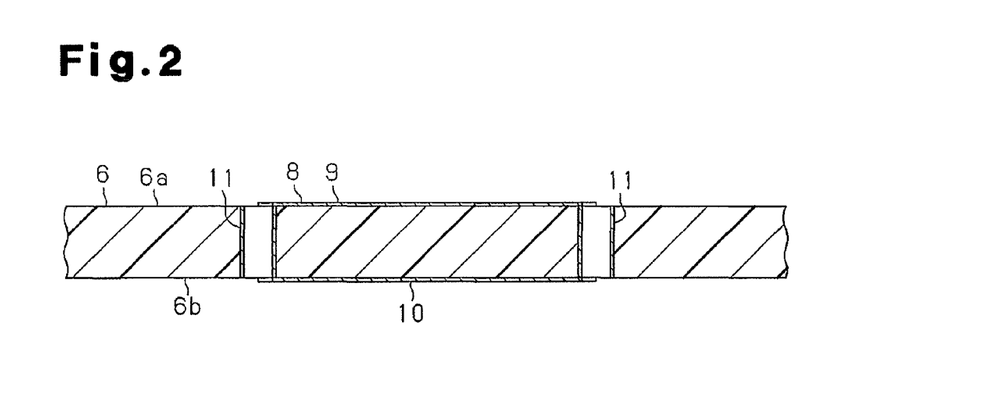
FIG. 2 is a cross-sectional view of a non-contact sensor.

Referring to FIG. 2, the board 6 is a double conductive layer substrate including a conductive layer on each of the front surface 6a and the rear surface 6b. Each coil element 8 is formed by conductors on the front surface 6a and the rear surface 6b of the board 6 and vias.

More specifically, each coil element 8 is formed by vias 11, which extend in the thicknesswise direction of the board 6, and the conductive strips 9 and 10, which extend in the planar direction of the board 6. As shown in FIG. 3B, each coil element 8 includes the bent folded portions 12 and may thus be referred to as an angled rectangular helical coil.

Figure 4:
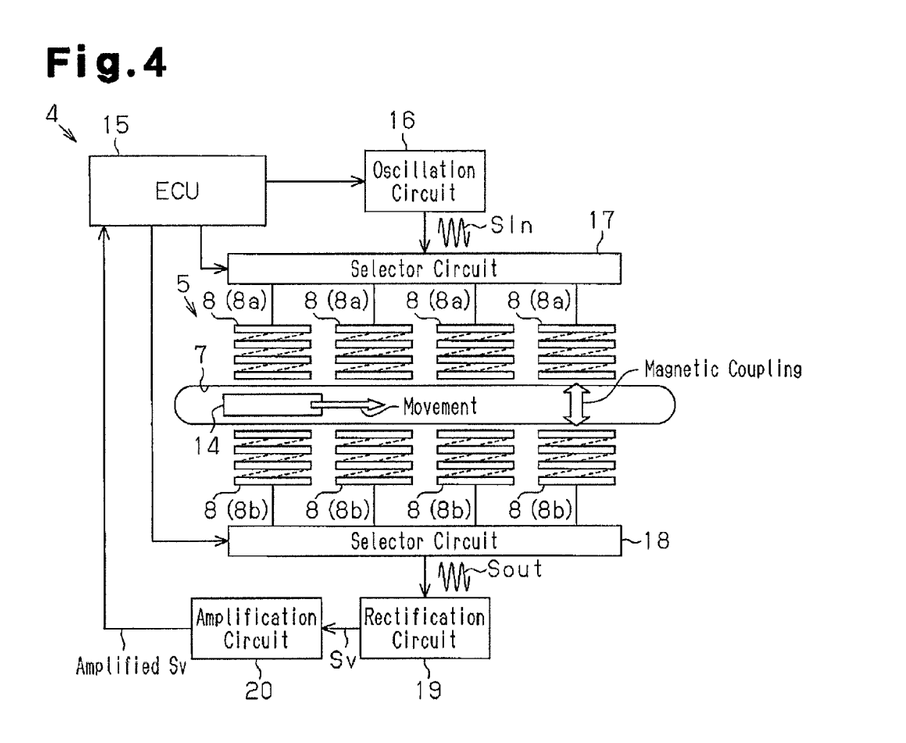
FIG. 4 is a block diagram of a position detector.

FIG. 4 shows the electric configuration of the position detector 4. The position detector 4 includes an electronic control unit (ECU) 15. An oscillation circuit 16 and an input selector circuit 17 connect the ECU 15 to the transmission coil elements 8a. The oscillation circuit 16 generates an oscillation signal Sin (alternating current) in response to an oscillation command from the ECU 15. The input selector circuit 17 provides a selected transmission coil element 8a with the oscillation signal Sin in response to a selection command from the ECU 15. The transmission coil element 8a provided with the oscillation signal Sin generates and outputs an AC magnetic field that traverses the groove 7.

An output selector circuit 18, a rectification circuit 19, and an amplification circuit 20 connect the reception coil elements 8b to the ECU 15. The output selector circuit 18 connects a selected reception coil element 8b to the rectification circuit 19 in accordance with a selection command from the ECU 15. The selected reception coil element 8b receives the AC magnetic field generated by the opposing transmission coil element 8a, generates an output signal Sout (alternating current) having an output value corresponding to the intensity of the magnetic field, and provides the output selector circuit 18 with the output signal Sout. The output signal Sout of the reception coil element 8b indicates the degree of magnetic coupling between the activated coil elements 8a and 8b. Accordingly, the output signal Sout indicates whether or not the detected object 14 is located between the opposing coil elements 8a and 8b. The output signal Sout of the reception coil element 8b is rectified by the rectification circuit 19, amplified by the amplification circuit 20, and provided to the ECU 15. The ECU 15, the rectification circuit 19, and the amplification circuit 20 may be referred to as a signal processing circuit. The oscillation signal Sin may be referred to as an input signal of a coil element 8.

Figure 5:
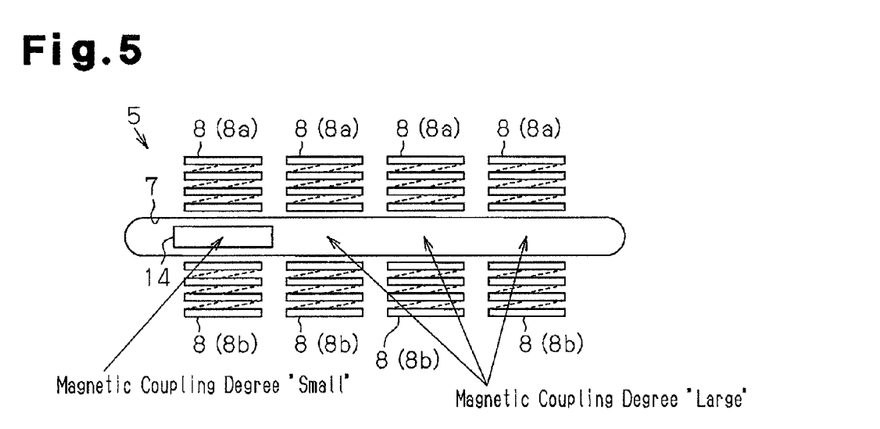
FIG. 5 is a schematic diagram illustrating the magnetic resistivity of coil elements that changes in accordance with the position of a detected object.

Referring to FIG. 5, when the detected object 14 is located between a transmission coil element 8a and a corresponding reception coil element 8b, the degree of magnetic coupling decreases in the coil pair. The degree of magnetic coupling decreases in accordance with the amount of a magnetic path that the detected object 14 blocks. When the detected object 14 is not located between a transmission coil element 8a and a corresponding reception coil element 8b, the degree of magnetic coupling rate does not change in the coil pair. Thus, in accordance with where the detected object 14 is positioned, a difference in amplification, that is, intensity, is produced between the oscillation signal Sin provided to the transmission coil element 8a and the output signal Sout of the corresponding reception coil element 8b. Based on the difference, the ECU 15 determines the position of the detected object 14, that is, the operational position of the shift lever 2.

An example of the non-contact sensor 5 will now be described.

Figure 6:
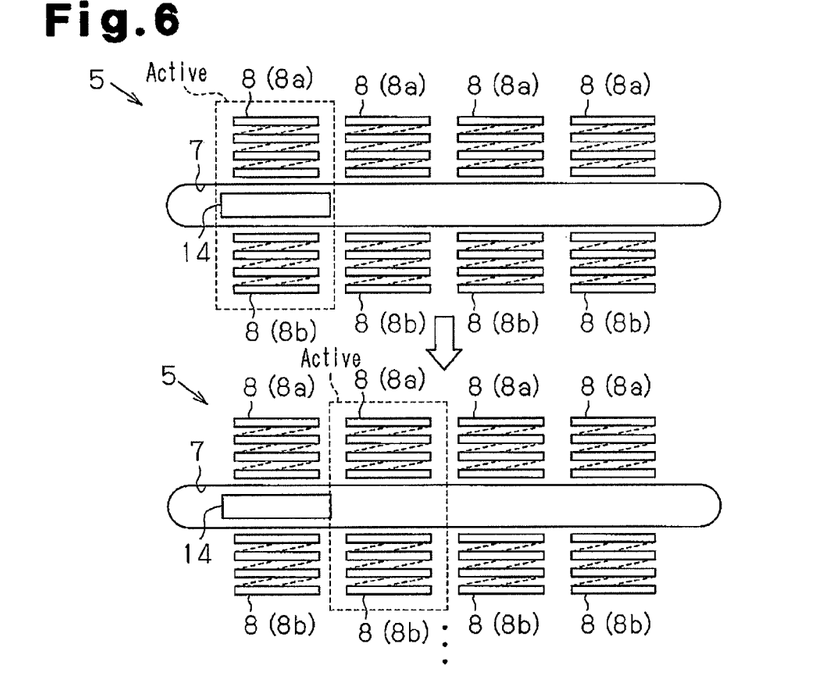
FIG. 6 is a schematic diagram illustrating sequential selection of the coil elements.

The oscillation circuit 16 generates an oscillation signal Sin (high frequency or low frequency alternating current) having a predetermined waveform in accordance with an oscillation command from the ECU 15. The input selector circuit 17 provides a selected transmission coil element 8a with an oscillation signal Sin in accordance with a selection command from the ECU 15. Referring to FIG. 6, the ECU 15 sequentially switches the transmission coil elements 8a, that is, the activated coil pairs, provided with the oscillation signal Sin. Further, the ECU 15 repeats the switching.

When the shift lever 2 is operated in the gate 3b, the detected object 14 is moved in the groove 7 between the coil elements 8a and 8b from one position to another position.

Figure 7:
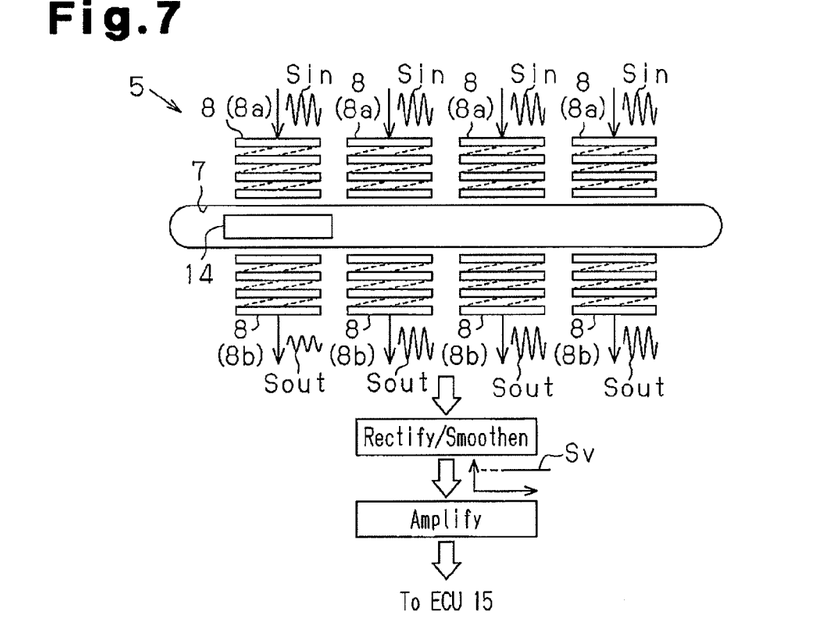
FIG. 7 is a schematic diagram illustrating the amplitude of output signals from the coil elements.

Referring to FIG. 7, the high conductivity of the detected object 14 weakens the magnetic coupling between the corresponding coil elements 8a and 8b where the detected object 14 is positioned. The magnetic field significantly weakened from the magnetic field output from the transmission coil element 8a is received by the opposing reception coil element 8b. Thus, in comparison with the current amount supplied to the transmission coil element 8a, the current amount recovered by the reception coil element 8b is significantly decreased.

In contrast, when the detected object 14 is not located between the corresponding coil elements 8a and 8b, the magnetic coupling of the coil elements 8a and 8b is not affected by the magnetic field blocking of the detected object 14. In this case, the transmission coil element 8a outputs a magnetic field with an intensity that is the same as the intensity of the magnetic field received by the opposing reception coil element 8b. The current amount supplied to the transmission coil element 8a is about the same as the current amount recovered by the opposing reception coil element 8b.

The rectification circuit 19 half-wave-rectifies and smoothes the output signal Sout of each reception coil element 8b and outputs a detection signal Sv (voltage signal). The amplification circuit 20 amplifies the detection signal Sv (voltage signal), which has a fixed value, and provides the ECU 15 with the detection signal Sv.

The ECU 15 controls the switching of the selector circuits 17 and 18 and thus recognizes the activated coil pair. The ECU 15 sequentially obtains the detection signals Sv corresponding to the output signals Sout output from the sequentially activated coil pairs. When the voltage value of the detection signal Sv is less than or equal to a threshold, the ECU 15 determines that the detected object 14 is located in the coil pair corresponding to the detection signal Sv. In this manner, the ECU 15 detects the position of the shift lever 2. The ECU 15 notifies the transmission or another ECU of the detected shift lever position.

As described above, the coil pairs include the transmission and reception coil elements 8a and 8b that are arranged at opposite sides of the groove 7. Further, the coil pairs are arranged along the groove 7. The movement of the detected object 14, which is directly or indirectly connected to the shift lever 2, changes the magnetic coupling of the coil elements 8a and 8b. The ECU 15 detects the position of the shift lever 2 based on changes in the magnetic coupling.

Figure 8A:
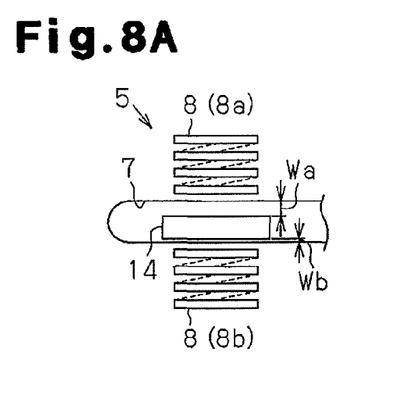
FIGS. 8A and 8B are schematic diagrams illustrating displacement of the detected object.
Figure 8B:
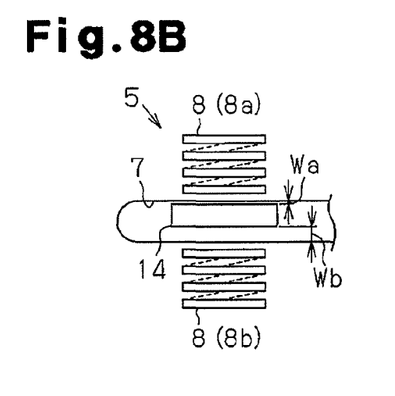

Referring to FIGS. 8A and 8B, the degree of magnetic coupling between the coil elements 8a and 8b when the detected object 14 is located between opposing coil elements 8a and 8b, is proportional to a sum Wa+Wb of the distance Wa from the detected object 14 to the transmission coil element 8a and the distance from the detected object 14 to the reception coil element 8b. The distance sum Wa+Wb does not change even when the detected object 14 is displaced toward the reception coil element 8b as shown in FIG. 8A or displaced toward the transmission coil element 8a as shown in FIG. 8B. Displacement of the detected object 14 in the widthwise direction of the groove 7 does not affect the magnetic coupling rate. In this manner, displacement of the detected object 14 does not affect the detection accuracy of the non-contact sensor 5. Accordingly, there is no need for accurate positioning of the detected object 14, and detection errors of the non-contact sensor 5 are reduced.

The coil elements 8a and 8b are arranged on the fixed board 6. The detected object 14, which may be a conductive block, is secured to the movable shift lever 2. The coil elements 8a and 8b and the detected object 14 have simple structures. Thus, the non-contact sensor 5 has a simple structure and reduces component costs.

The above embodiment has the advantages described below.

(1) The non-contact sensor 5 includes the board 6 and the coil elements 8. The board 6 includes the groove 7, and the coil elements 8 include the transmission and reception coil elements 8a and 8b arranged at opposite sides of the groove 7. The detected object 14 is connected to the shift lever 2 and moves in cooperation with the shift lever 2 along the groove 7. Movement of the detected object 14 changes the degree of magnetic coupling between the coil elements 8a and 8b. The signal processing circuit (ECU 15 and the like) calculates the movement amount of the shift lever 2 based on the output signal Sout of the coil elements 8. The output signal Sout indicates the magnetic coupling rate between the coil elements 8a and 8b. When the detected object 14 is positioned between the coil elements 8a and 8b, the magnetic coupling rate of the coil elements 8a and 8b does not change even if the detected object 14 is displaced toward the transmission coil element 8a or the reception coil element 8b. Thus, the detection accuracy of the non-contact sensor 5 is not affected by the position of the detected object 14 in the groove 7 in the widthwise direction of the groove 7. This reduces detection errors of the non-contact sensor 5.

(2) The ECU 15 is provided with the output signal Sout from the coil pairs that are arranged on the board 6. Thus, the ECU 15 detects the position of the shift lever 2, which moves to a number of positions (M position, + position, and − position).

(3) The coil elements 8 of the non-contact sensor 5 are arranged on the board 6. Thus, for example, space occupied by conventional components may be used for the non-contact sensor 5. This allows the non-contact sensor 5 to be installed in a conventional shift lever device without enlarging the shift lever device.

(4) Each coil element 8 includes the front conductive strips 9, which are formed on the front surface 6a of the board 6, the rear conductive strips 10, which are formed on the rear surface 6b of the board 6, and the vias 11, each coupling a front conductive strip 9 and a rear conductive strip 10. The coupled front conductive strips 9, the vias 11, and the rear conductive strips 10 form the folded portions 12. The coil elements 8 may be formed on the board 6 employing a method for forming the strips and the vias.

It should be apparent to those skilled in the art that the present invention may be embodied in many other specific forms without departing from the spirit or scope of the invention. Particularly, it should be understood that the present invention may be embodied in the following forms.

Figure 9:
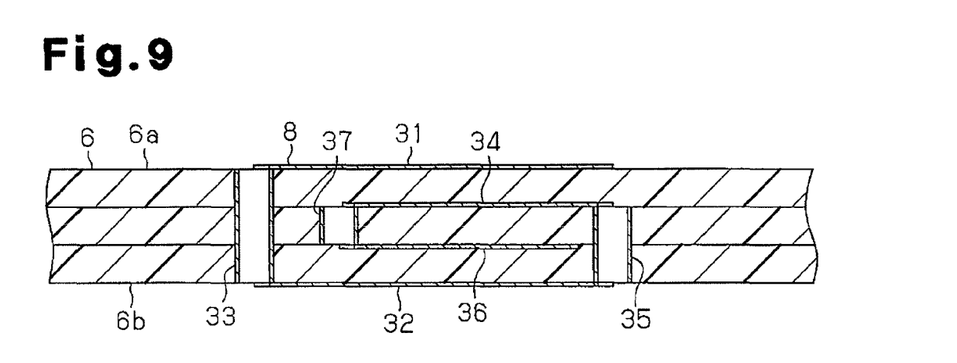
FIG. 9 is a cross-sectional view of a non-contact sensor in a first modification.

In the example shown in FIG. 9, the board 6 is a quadruple conductive layer substrate. The board 6 includes a through via 33 coupling a conductive strip 31 on the front surface 6a and a conductive strip 32 on the rear surface 6b. A conductive strip 34 embedded in the board 6 is coupled to the conductive strip 32 on the rear surface 6b by a non-through via 35. The conductive strip 34 is connected to a further conductive strip 36 embedded in the board 6 by a non-through via 37. The board 6 may be any type of a multiple conductive layer substrate, such as multi-layer printed circuit board.

Figure 10:
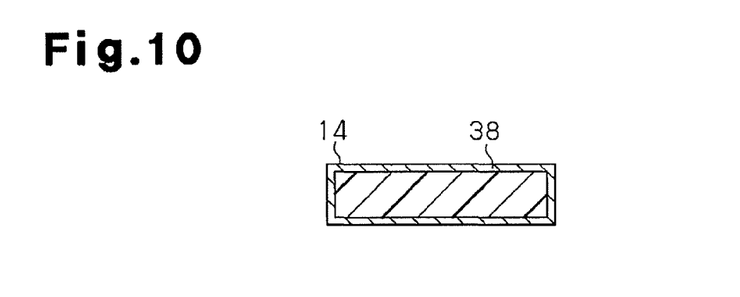
FIG. 10 is a cross-sectional view of detected object in a second modification.
Figure 11:
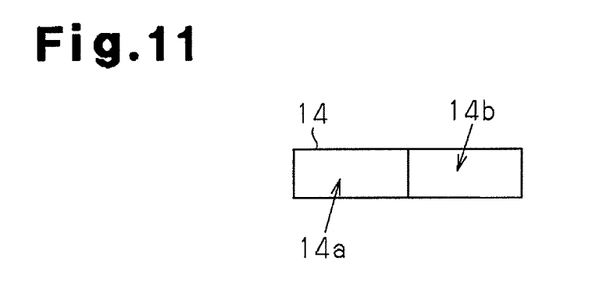
FIG. 11 is a schematic diagram of a detected object in a third modification.

The detected object 14 is not restricted to a member having a uniform composition and may be a member having a non-uniform composition. In the example shown in FIG. 10, the surface of the detected object 14 may be coated by a metal layer 38. In this case, the detected object 14 may include a non-conductive core of synthetic resin or the like. In the example shown in FIG. 11, the detected object 14 is a single member formed by integrating multiple components formed from materials that change the degree of magnetic coupling. For example, the components include a component 14a, which is formed from a material that greatly increases the degree of magnetic coupling, and a component 14b, which is formed from a material that slightly decreases the degree of magnetic coupling.

Figure 12A:
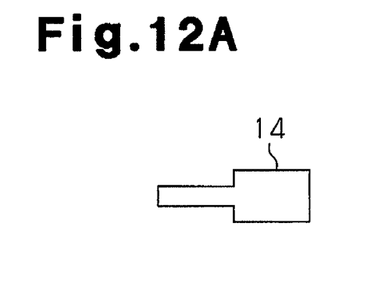
FIGS. 12A and 12B are schematic diagrams of a detected object in a further modification.
Figure 12B:
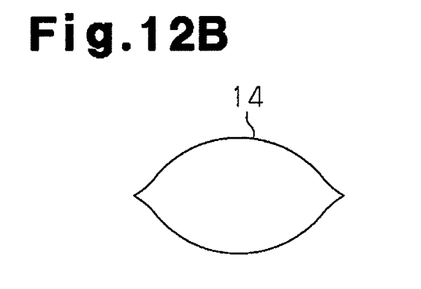

The detected object 14 may have an uneven thickness. In the example shown in FIG. 12A, the detected object 14 has a thickness varied in a stepped manner. In the example shown in FIG. 12B, the detected object 14 includes two acute ends and has a gradually varying thickness. In another example, the detected object 14 may be spherical.

One of the selector circuits 17 and 18 may be omitted.

The selector circuits 17 and 18 may be omitted. In this case, a plurality of coil drive circuits, each including the oscillation circuit 16, the rectification circuit 19, and the amplification circuit 20, may be connected to the coil pairs, respectively.

The groove 7 does not have to be a slit that extends through the board 6 and may be an elongated depression having a closed bottom.

The board 6 may be a board dedicated for the non-contact sensor 5. Alternatively, the board 6 may be a board shared by components of the shift lever device 1 other than the non-contact sensor 5.

The substrate is not limited to the board 6, and may be a member that is not plate-shaped.

The shift lever device 1 is not limited to a stationary type and may be momentary type. The shape of the gate 3 may be changed.

The number of windings of the transmission coil elements 8a may differ from the number of windings of the reception coil element 8b.

The coil elements 8 formed on the board 6 may have any of a variety of wiring structures as long as a coiled pattern may be formed on the board 6.

There may be only one coil pair.

The non-contact sensor 5 is not restricted to detection of the shift lever 2 at the + position, the − position, and the M position and may be configured to detect the P position, the R position, the N position, and the D position.

The non-contact sensor 5 may be arranged in a device other than the shift lever device 1 such as a lever combination switch. In this case, the detection subject may be an article other than the shift lever 2.

Further, the shift lever device 1 and a device other than the shift lever device 1 may include a plurality of non-contact sensors 5.

The present examples and embodiments are to be considered as illustrative and not restrictive, and the invention is not to be limited to the details given herein, but may be modified within the scope and equivalence of the appended claims.

The invention claimed is:

1. A non-contact sensor that detects a movement amount of a detection subject, the non-contact sensor comprising:
a substrate including a groove;
a plurality of pattern coils including two opposing pattern coils arranged on opposite sides of the groove;
a detected object connected to the detection subject and moved in cooperation with the detection subject along the groove, wherein movement of the detected object changes a degree of magnetic coupling between the two pattern coils; and
a signal processing circuit that calculates a movement amount of the detected object based on an output value provided from the pattern coils,
wherein
the substrate is a board including a front surface and a rear surface,
each of the pattern coils includes
a plurality of front conductive strips formed on the front surface of the board,
a plurality of rear conductive strips formed on the rear surface of the board, and
a plurality of vias formed in the board, wherein each of the vias couple one of the front conductive strips and one of the rear conductive strips; and
a plurality of folded portions is formed by the coupled ones of the front conductive strips, the vias, and the rear conductive strips.

2. The non-contact sensor according to claim 1, wherein the pattern coils are arranged along the groove.

3. A shift lever device comprising:
a substrate including a groove;
a movable detected object connected to a shift lever and moved in cooperation with the shift lever along the groove;
two opposing pattern coils arranged on opposite sides of the groove, wherein a degree of magnetic coupling between the two pattern coils changes in accordance with where the detected object is positioned; and
a signal processing circuit calculates an operational position of the shift lever based on an output value from one of the two pattern coils,
wherein
the substrate is a board including a front surface and a rear surface,
each of the two pattern coils includes
a plurality of front conductive strips formed on the front surface of the board,
a plurality of rear conductive strips formed on the rear surface of the board, and
a plurality of vias formed in the board, wherein each of the vias couple one of the front conductive strips and one of the rear conductive strips, and
a plurality of folded portions formed by the coupled ones of the front conductive strips, the vias, and the rear conductive strips.

4. A shift lever device comprising:
a shift lever; and
a non-contact sensor that detects where the shift lever is positioned,
wherein the non-contact sensor includes
a substrate including a front surface, a rear surface, a groove, and a plurality of coil elements arranged on opposite sides of the groove to allow for magnetic coupling therebetween, and
a movable block connected directly or indirectly to the shift lever and moved along the groove,
wherein each of the coil elements includes
a plurality of first strips formed on the front surface of the substrate,
a plurality of second strips formed on the rear surface of the substrate, and
a plurality of through vias, wherein each of the through vias series-connects one of the first strips and one of the second strips to form the corresponding coil element.

5. The shift lever device according to claim 4, wherein each of the coil elements includes
one or more third strips embedded in the substrate between the front surface and the rear surface,
a non-through via including two ends arranged in the substrate and in either one of the front surface and the rear surface of the substrate, wherein the non-through via series-connects the one or more third strips and one of the first strips and the second strips.

6. The shift lever device according to claim 4, wherein the through vias include a tubular via.

7. The shift lever device according to claim 4, wherein each of the first strips and each of the second strips are straight.

8. The shift lever device according to claim 4, wherein each of the coil elements includes two terminals, and the terminals of the coil elements are all exposed on the same surface of the substrate.

* * * * *